United States Patent
Urban et al.

(10) Patent No.: US 8,720,131 B2
(45) Date of Patent: May 13, 2014

(54) INSTALLATION SYSTEM FOR PV MODULES

(75) Inventors: Hans Urban, Haag (DE); Cedrik Zapfe, Grafing (DE)

(73) Assignee: Schletter GmbH, Kirchdorf (DE)

( * ) Notice: Subject to any disclaimer, the term of this patent is extended or adjusted under 35 U.S.C. 154(b) by 421 days.

(21) Appl. No.: 12/997,267

(22) PCT Filed: Jun. 11, 2009

(86) PCT No.: PCT/DE2009/000811
§ 371 (c)(1),
(2), (4) Date: Apr. 5, 2011

(87) PCT Pub. No.: WO2009/149700
PCT Pub. Date: Dec. 17, 2009

(65) Prior Publication Data
US 2011/0174353 A1      Jul. 21, 2011

(30) Foreign Application Priority Data
Jun. 11, 2008  (DE) .......................... 10 2008 027 857

(51) Int. Cl.
*E04D 13/18*      (2014.01)
(52) U.S. Cl.
USPC ...... 52/173.3; 52/474; 52/489.1; 248/225.11; 248/224.7
(58) Field of Classification Search
USPC ............... 52/173.3, 474, 489.1, 167.7, 167.8; 136/244, 251, 291; 126/621–623; 248/122.1
See application file for complete search history.

(56) References Cited

U.S. PATENT DOCUMENTS

| | | | | |
|---|---|---|---|---|
| 5,143,556 A * | 9/1992 | Matlin | .......................... | 136/244 |
| 5,480,494 A | 1/1996 | Inoue | | |
| 2007/0131273 A1* | 6/2007 | Kobayashi | .................... | 136/251 |
| 2009/0019795 A1* | 1/2009 | Szacsvay et al. | ............ | 52/173.3 |
| 2009/0025313 A1 | 1/2009 | Smidt | | |
| 2009/0114270 A1* | 5/2009 | Stancel | .......................... | 136/251 |
| 2009/0294613 A1* | 12/2009 | Cline | ....................... | 248/221.11 |
| 2011/0073155 A1* | 3/2011 | Sillmann et al. | ............... | 136/244 |
| 2011/0253859 A1* | 10/2011 | Ostermeier et al. | ..... | 248/223.41 |

FOREIGN PATENT DOCUMENTS

| | | |
|---|---|---|
| DE | 40 14 200 A1 | 11/1990 |
| DE | 41 40 832 A1 | 6/1993 |
| DE | 44 16 884 A1 | 11/1995 |
| DE | 101 05 718 A1 | 8/2002 |
| DE | 103 29 184 A1 | 1/2005 |
| DE | 10 2004 055 187 A1 | 5/2006 |
| DE | 20 2008 015237 U1 | 2/2009 |
| EP | 1 348 915 A2 | 10/2003 |
| EP | 17 86 041 A2 | 5/2007 |
| WO | WO 01/03206 A1 | 1/2001 |

* cited by examiner

*Primary Examiner* — Charles A Fox
*Assistant Examiner* — Patrick Maestri
(74) *Attorney, Agent, or Firm* — Norman B. Thot

(57) ABSTRACT

A mounting system for photovoltaic modules includes at least two profile-shaped cross rails arranged parallel to each other and configured to hold several PV modules. Each cross rail includes plane supporting surfaces. The PV module is mounted by placing it onto the at least two cross rails so that the at least two holders lay flat on the plane supporting surfaces of the at least two cross rails. The PV module is then moved in a joining direction perpendicular to the cross rails while lying on the plane supporting surfaces so that either a recess engages with an integrated protrusion or a protrusion engages with an integrated recess. A retaining safety device is disposed between at least one cross rail and its corresponding holder and is configured to counteract a move against the joining direction.

28 Claims, 8 Drawing Sheets

INSTALLATION SYSTEM FOR PV MODULES

CROSS REFERENCE TO PRIOR APPLICATIONS

This application is a U.S. National Phase application under 35 U.S.C. §371 of International Application No. PCT/DE2009/000811, filed on Jun. 11, 2009 and which claims benefit to German Patent Application No. 10 2008 027 857.2, filed on Jun. 11, 2008. The International Application was published in German on Dec. 17, 2009 as WO 2009/149700 A2 under PCT Article 21(2).

FIELD

The present invention provides a mounting system by which photovoltaic modules are mountable on a supporting structure by means of holders without using any tools. The holders are adhesively affixed to the PV modules' back side. Such mounting systems are used, for example, for large-scale photovoltaic on-roof installations and open area installations comprising frameless thin-film modules.

BACKGROUND

DE 101 05 718 A1 describes a photovoltaic module group whose PV modules can be suspended into a supporting structure. Agraffes from the facade mounting sector are provided on the back side of the PV modules forming a hook connection together with bolts on the supporting structure. U.S. Pat. No. 5,480,494 A describes PV modules comprising base bodies formed from a metal sheet that can be mounted to supporting structures by using various hook connections.

DE 103 29 184 A1 describes a system for mounting roof construction elements. The system comprises several adhesion connectors whose corresponding joining elements act according to the hook-and-loop principle. The joining elements can be arranged on the back side of the PV module in a self-adhesive manner.

DE 10 2004 055 187 A1 describes profile rails for photovoltaic modules that can be adhesively affixed onto the back side of a frameless PV module by using a silicone adhesive and that can be screwed with a supporting structure.

U.S. Pat. No. 5,143,556 A describes an elevation for a PV module field whose modules can be mounted on supporting rails by using holders that are adhesively affixed onto the modules' back side. Each holder includes the bead at a bolt's head in a clip-like manner, wherein the bolts are singly sticking out from the supporting rails.

With increasingly larger module formats, existing mounting systems no longer fulfill the manufacture and installation requirements of industrial photovoltaic plants. Some of the known systems are also not designed for high wind and snow loads.

SUMMARY

An aspect of the present invention is to provide a mounting system for PV modules by which particularly large-surface frameless thin-film modules can be carefully and safely held with consideration to high wind and snow loads. An alternative aspect of the present invention is to provide a mounting system which can be installed without using any tools and which is easy to manufacture.

In an embodiment, the present invention includes a mounting system for photovoltaic modules which includes at least two profile-shaped cross rails arranged parallel to each other and being configured to hold several PV modules and at least two holders, each of the holders being configured to be attached or be attachable to a back side of a PV module via an adhesive agent. Each of the profile-shaped cross rails includes plane supporting surfaces. The PV module is configured to be mounted to the at least two profile-shaped cross rails via the at least two holders, whereby each profile-shaped cross rail is allocated to at least one holder and either each holder includes a recess and each profile-shaped cross rail includes an integrated protrusion or each holder includes a protrusion and each profile-shaped cross rail includes an integrated recess. The PV module is mounted by placing the PV module onto the at least two profile-shaped cross rails so that the at least two holders lay flat on the plane supporting surfaces of the at least two profile-shaped cross rails, the PV module then being moved in a joining direction perpendicular to the profile-shaped cross rails while lying on the plane supporting surfaces so that either the recess engages with the integrated protrusion or the protrusion engages with the integrated recess. A retaining safety device is disposed between at least one profile-shaped cross rail and its corresponding holder. The retaining safety device is configured to counteract a move against the joining direction.

BRIEF DESCRIPTION OF THE DRAWINGS

The present invention is described in greater detail below on the basis of embodiments and of the drawings in which.

DETAILED DESCRIPTION

Figure 1:
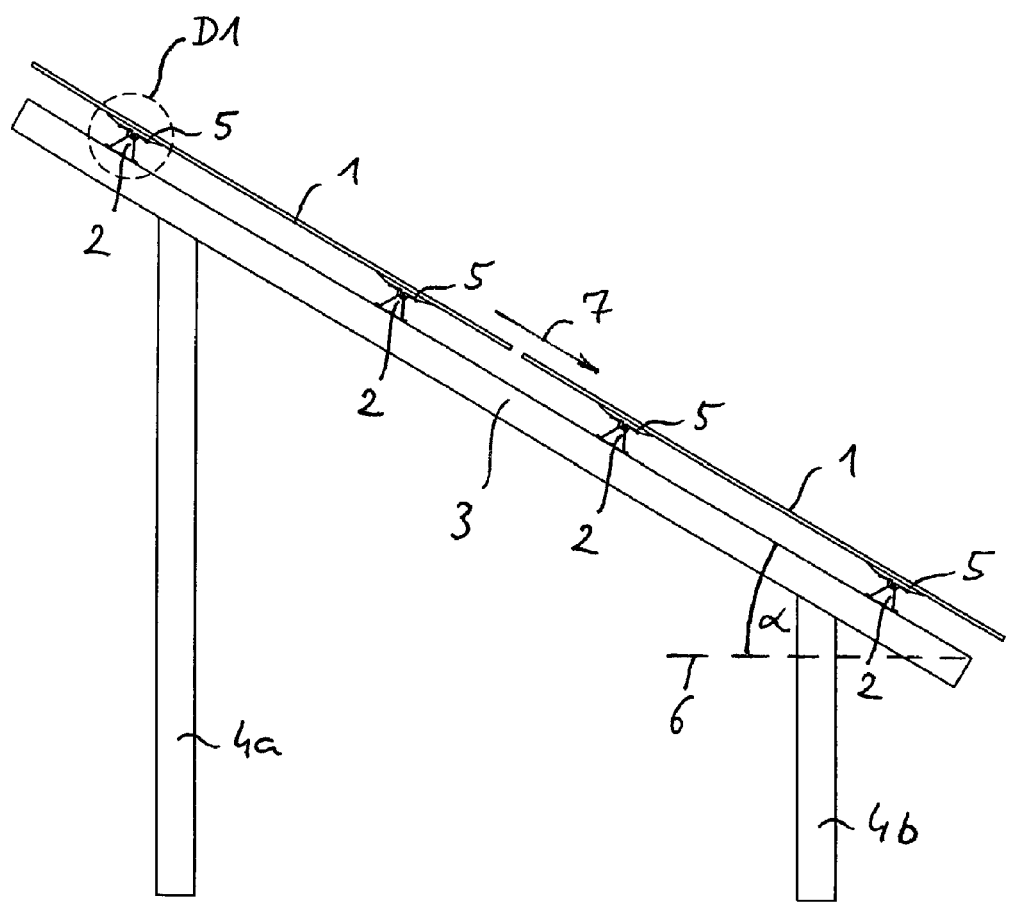
FIG. 1 is a lateral view of an elevated PV module field.

The cross rails mainly provide a retaining function for the holders and can thus be supported by additional supporting structure for supporting several PV modules in a kind of sandwich construction. The cross rails can at the same time provide the function of a load bearing girder for several PV modules. The cross rails should run in a cross direction within a substructure to promote the retaining function. In the field of photovoltaic systems, this means that the cross rails are aligned in a cross direction to the PV modules' edges running downwards and/or to the slope line of the PV modules, i.e. to the direction of downhill force. In slant arrangement, the cross rails are thus recognized easily in that they are—for example, horizontally—arranged in different heights.

Each of the cross rails also comprises a plane supporting surface that can also be composed of several parts. The supporting surfaces of the cross rails can thereby build a common inclined plane that is, for example, parallel to the module plane. The joining direction then, for example, runs downwards and in parallel to the said plane. However, it is also conceivable to provide the supporting surfaces stepwise one below the other. In the case of a common inclined plane, the said plane can be inclined as regards a horizontal plane, for example, in a solar-energetically suitable angle ranging from 20 to 50 degrees.

The mounting system further comprises several holders which are, for example, identical in construction and which are each fixed or fixable to the back side of PV module by using an adhesive agent. The adhesive agent may, for example, be a silicone-based adhesive which has proven to be reliable in the field of construction engineering for the material combination of metal and glass even under extreme weather conditions. An example includes two-component silicone adhesives. It is also possible to use, for example, epoxy resin, polyester resin, poly urethane or acrylate adhesives. Furthermore, the adhesive agent can also be provided as a support layer covered with adhesive on both sides. Such a support layer may, for example, be embodied as a double sided adhesive pad, for example, corresponding to the holder's dimensions. The support layer may have been applied prior to connecting the holder with the module's back side, i.e. in a pre-manufactured manner, onto the holder or, alternatively, onto the PV module, and provided with a removable protective film in an appropriate manner.

By means of the holders, the PV module can be mounted to the cross rails for which purpose each cross rail has at least one holder associated or allocated therewith and each holder has a recess and each cross rail has an integrated protrusion. Alternatively, it is also possible that each holder has such a protrusion and each cross rail has an integrated recess. For mounting, the PV module is then firstly placed onto the cross rails such that the holders lay flat on the supporting surfaces of the cross rails. Herefor, the holders each, for example, comprise a plane contact surface at which the holders can be placed onto the supporting surface of the respective cross rail under plane contact and are correspondingly guided in a shiftable manner thereon. Secondly, while laying thereon, the PV module can be shifted in a joining direction perpendicular to the cross rails, wherein the recesses and the protrusions engage more and more with each other during shifting. The joining direction is also parallel to the supporting surfaces and can, for example, run inclined downwards in the direction of the slope line and/or parallel to an outer edge of the PV module running downwards.

The recess of a holder can, for example, be embodied as an indentation of a hook. Such a hook can, for example, stick out from the contact surface of the holder. The protrusion of the respective cross rail operating as a counterpart may be embodied as an overhang of an undercut groove that is integrated within the cross rail's profile and into which the hook is inserted during the placing. The opening slot of such an undercut groove can separate the supporting surface of the cross rail in, for example, two partial areas having approximately the same width.

It is also possible that the recess is provided as an undercut of a hook integrated within the respective cross rail and that the protrusion is provided as an overhang of an undercut groove within the respective holder. The hook can here stick out from the supporting surface of the cross rail and the undercut groove can separate the contact surface of the holder.

In an embodiment, the mounting system according to the present invention can also comprise a retaining safety device. The retaining safety device is provided between at least one cross rail and a holder associated therewith and counteracts a possible backshift of the holder against the joining direction, for example, in the case of wind suction. Such a retaining safety device may, for example, be designed as a snap-fit, or snap-in, connection comprising several joining positions and/or as a blocking device.

The present invention comprises several advantages. The mounting system according to the present invention is, for example, suitable with regard to manufacture and mounting. The holders can be fixed or attached, for example, in a factory-provided manner, to the back side of the PV module by using an automated and controlled process by means of adhesive bonding. It is also possible to mount the holders thereto on-site. In case the adhesive agent, such as a silicone adhesive, has elastic properties, stresses resulting from temperature and mounting can also be absorbed and the PV module can be supported in a cushioned manner.

As the protrusion or the recess, respectively, has already been integrated within the profile-shaped cross rail, the manufacture of the cross rails is particularly easy. Thus, the latter may, for example, be manufactured by extrusion molding or roll forming. It is also possible to design the cross rails with a very high bearing capacity so that the cross rails may support several PV module over a wide span width.

Because of the protrusions or the recesses, respectively, being integrated in the cross rails or rather extending continuously therein, it is possible upon installation to mount the PV module at any arbitrary position along the cross rails. The installation is also carried out without using any tools and in an ergonomic manner. The joining process is therefore divided in a free placing onto the plane supporting surfaces of the cross rails and a subsequent smoothly shifting in a downward direction. If necessary, the PV modules may further be shifted after the placing into another mounting position in parallel to the cross rails. Dividing the joining process in the aforementioned manner is particularly advantageous for large-surface and thus accordingly heavy PV modules.

The plane supporting surfaces offer statics advantages. Every holder rests on the associated cross rail with a comparatively large contact area so that a correspondingly stable and easily calculable load transmission is possible. This applies, for example, for high snow and wind loads. The mounting system is thus suitable for frameless thin-film modules with a surface area of significantly more than one square meter.

A further advantage is that tolerances of the distance of the cross rails and the holders resulting from manufacture and mounting can be compensated. In case the cross rails are, for example, spaced apart from each other too broadly or too narrowly, this can be compensated by means of a various deep engagement of recess and protrusion. Independently from the depth of engagement, the holders can therefore always rest on the plane supporting surfaces having plane contact and can be shifted thereon depending on the actual distance situation.

The retaining safety device therefore prevents the recess and the protrusion from being released from their engagement in the direction against the joining direction, for example, under extreme wind conditions. The retaining safety device may alternatively or additionally also be designed as an anti-theft device.

Not only the cross rails, but also the holders may be mass-produced in a simple manner using an extrusion molding process. The holders can, for example, be substantially embodied in form of an extrusion molded part or be cut off from a corresponding extrusion molded profile. As for the cross rails, the respective recess and protrusion can be integrated by extrusion as well.

The mounting system according to the present invention thus makes a significant contribution to supporting structures for industrial photovoltaic systems that are easier to manufacture and easier to mount, thereby contributing to increasingly large-scale and more cost efficient PV modules.

In an embodiment of the present invention, the holders can be arranged at positions within the inner or interior surface area of the PV module's back side at a distance from the outer contour of the PV module. The holders can be arranged in such a way that the PV module undergoes as low a deflection as possible in its position of use. In this way, the module may, for example, be preserved and its bearing properties for snow loads may be increased. If there are exactly four holders provided for the PV module, the holders or rather their centers may be arranged inwardly at a distance to the outer edges of the PV module by, for example, 17% to 27% of the distance towards the respective opposite outer edge. According to a rule of Bessel, a distance to the center of the holders can, for example, be of about 22%.

For arranging the holders onto the back side of the PV module, a mounting template can be provided determining the positions for arranging the holders relative to the outer contour of the PV module. By using such a mounting template, the holders can also still be adhesively affixed to the PV modules at the construction site of the photovoltaic system, for example, by using the aforementioned double sided adhesive pads. When using double sided adhesive layers, it is also possible to affix the latter in a factory-provided manner exactly at the desired positions onto the back side surface of the PV modules. In this way, the holders can be positioned on the adhesive layers at the construction site after drawing off a corresponding protective film, whereby the use of a mounting template can be avoided. The adhesive film therefore marks those positions for arranging. For easy mounting and an exact positioning process, the adhesive layer can respectively correspond with the outer outline of the holders' adhesion surface being provided therefor.

In an embodiment of the present invention, the holders can each comprise a plane supporting body or structure having a contact surface and an adhesion surface being parallel thereto. The contact surface and the adhesion surface, or surface for adhesion, can, for example, be plane. The supporting body or rather the adhesion surface thereof may additionally have a rectangular format, whereby the longer side thereof can, for example, be aligned in parallel to a longer side of an optionally rectangular PV module. It is of course also possible to provide the supporting body with other forms, for example, also with square or circular adhesion surfaces. In each case, the respective adhesion surfaces of the holders and the supporting bodies that have to be provided with an adhesive agent are sufficiently large in order to retain the PV module safely and to support it gently. The plane supporting bodies can, for example, narrow towards the outer edges of its adhesion surfaces. This means that the material thickness behind the adhesion surface diminishes from the center or from a central area of the holder or rather it's supporting body to its outside, for example, in a continuous manner. Due to this diminution, the rigidity of the holder, i.e. its supporting body reduces towards its outside, thus preventing a sudden rigidity alteration between the supported and the unsupported areas of the PV module. Rigidity steps and local stress peaks resulting therefrom may thus be avoided effectively, thus preserving the PV module particularly with respect to high snow loads and dynamic wind loads. Thrust and shear forces acting on the adhesion may thereby also be reduced. A supporting body designed in the said way can, for example, have a trapezoid-like and thus extrudable cross section or can be shaped like a truncated pyramid having four or more edges or can be shaped similar to a truncated cone. Other shapes for the supporting bodies are conceivable in which the material thickness reduction towards the outside is not linear but, for example, parabola- or hyperbola-shaped. This can be of particular advantage for rotationally symmetrical shapes.

In an embodiment of the present invention, the recesses and the protrusions appropriately engage with each other in a form-fitting manner when shifting in the joining direction. A sliding clearance can, for example, be provided such that the recesses and the protrusions inter-engage under a sliding fit. Therefore, the protrusions and the recesses can, for example, be rigidly designed. In this way, stable and easily calculable connection between the holders and the cross rails is generated comparable to a groove-tongue-connection having a sliding fit. A lifting of the holders off the supporting surfaces is thus not possible even under extreme wind suction conditions.

It is also possible that the recess and/or the protrusions are at the same time limited by the supporting surface of the cross rail or of the contact surface of the holder, respectively. It can also be advantageous if a sliding fit is provided between the contact surface as well as an opposite parallel flank thereto at the protrusion or the recess of the holder, on the one hand, and the supporting surface as well as an opposite parallel flank thereto at the protrusion or the recess of the cross rail, on the other hand. The flanks can hereby be directly or diagonally opposite to the supporting surface, respectively, to the contact surface. It is important for the sliding fit that the respective flank appropriately counteracts the supporting surface or contact surface, respectively.

Alternatively or additionally, it is possible that the recesses and the protrusions engage with each other in a force-transmitting and form-fitting manner. At least one flank of the recesses and/or at least one flank of the protrusions may therefore be designed elastically, for example, in form of an integrated bendable bar, or may abut against elastic elements, in particular against a metal spring. Such a spring can be arranged between the flank of a protrusion and the flank of a recess. It is also conceivable to design the protrusion completely in form of a bendable bar. In each case, it is advantageous for compensating distance tolerances if the maximum possible engagement between the recesses and the protrusions is dimensioned appropriately, for example, at at least 4 mm. A sliding fit should, for example, exist while engaging.

In an embodiment of the present invention, a snap-fit or snap-in connection comprising several successive joining positions can be provided between at least one cross rail and a holder associated therewith for retaining safety in an arresting manner. During the shifting process, the joining positions here follow successively in the aforementioned joining direction, for example, in equal distances. In this way, the cross rails and the holders can be connected to each other free from play despite any distance deviation resulting from manufacture or mounting. It is thereby possible to design the snap-fit connection so that the latter operates against the joining direction in a locking manner, whereby disassembling is then possible without further efforts.

The snap-fit connection can, for example, comprise a row of teeth integrated within the cross rail and a snap-fit hook elastically arranged at the respective holder, wherein the snap-fit hook interacts with the row of teeth. It is also conceivable to provide the snap-fit connection in the way that an elevation is integrated within the cross rail, for example, in form of a hooked nose, and an elastically arranged row of teeth is provided at the holder, the row of teeth interacting with the elevation. It is also hereby possible to provide several successive elevations, for example, in form of a second fixed row of teeth interacting with the elastic row of teeth.

In an embodiment of the present invention, it is also possible to arrange the elements of the snap-fit connection, such as, for example, a snap-fit hook and a row of teeth, at the flanks of the protrusions and/or of the recesses. It is also possible to arrange the elements of the snap-fit connection such that the elements limit the respective protrusions and/or recesses. One of the elastic elements of the snap-fit connection can, for example, press the holder against the supporting surface of the cross rail.

In an embodiment of the present invention, a blocking element can be disposed at at least one holder for retaining safety in an blocking manner, wherein the blocking element, in a release position, allows a shifting of the holder in joining direction over the supporting surface of the cross rail associated therewith and, in a blocking position, blocks a shifting against the joining direction. The blocking element can, for example, be a latch arranged at the holder interacting with a limit stop at the cross rail. Thereby, it can be advantageous if, in the release position, the latch is turned in a recess provided within the contact surface of the holder and turned out while shifting in the joining direction and abut against the limit stop of the cross rail in the blocking position.

In an embodiment of the mounting system of the present invention, for each PV module, four point-like acting holders and two cross rails are provided, wherein two holders are associated with one of the two cross rails, respectively. Alternatively, it is possible that each of two cross rails is associated by only one line-like acting holder such that the PV module is supported only by two holders. Depending on the module size, it is furthermore possible to provide more than two cross rails and also more than two holders per cross rail and PV module. For large-surface PV modules, two or three cross rails and three holders each can be provided. For module formats having an area of several square meters, more holders and cross rails are also correspondingly possible.

Figure 2:
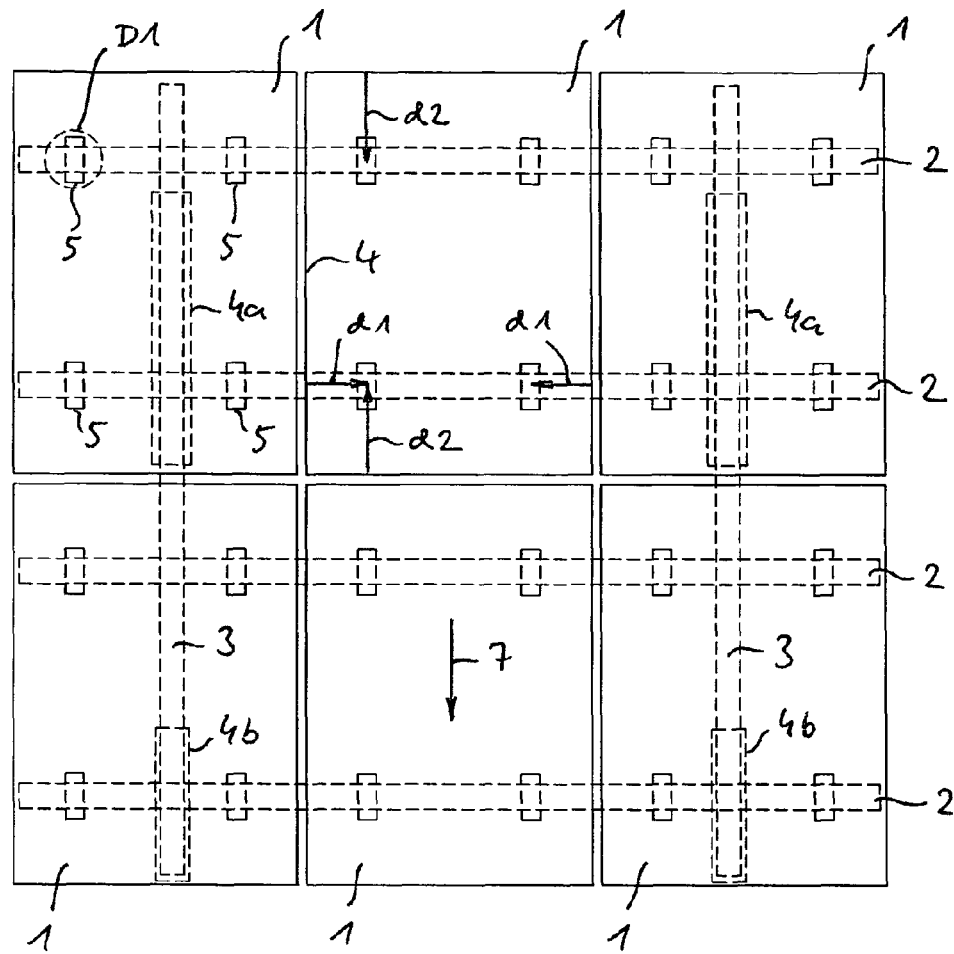
FIG. 2 is a view perpendicular onto the plane of the PV module field according to FIG. 1.

FIG. 1 and FIG. 2 schematically show how the mounting system according to the present invention is integrated within an elevated PV module field. The PV module field is composed of six PV modules 1 that have a rectangular format which are identical in construction and which are embodied in form of frameless thin-film modules. The PV modules 1 are elevated onto a supporting structure in an inclined manner. The supporting structure comprises two high posts 4 *a* and two low posts 4 *b* as well as two inclined girders 3, each arranged above the posts 4 *a* and 4 *b* in an inclined manner. The two inclined girders 3 hereby form an inclined installations plane that is inclined with respect to a horizontal plane 6 in an angle α of about 30°. The installation plane is moreover parallel to the module plane so they have a downhill force direction and slope line corresponding to the angle α and represented by the arrow 7.

The supporting structure additionally comprises four cross rails 2 which are identical in construction. The cross rails 2 are arranged on the two inclined girders 3 and run in a cross direction thereto. The four cross rails 2 are spaced parallel to each other, wherein two adjacent cross rails 2 each hold and support three of the PV modules 1 in a row. Two module rows are thus provided with three PV modules 1 each. The cross rails 2 are furthermore profile-shaped, i.e., they have a uniform cross section all over their length as can be seen in detail in FIG. 4. The mounting system according to the present invention comprises the said cross rails 2.

It is also possible to mount the cross rails 2 onto a pitched roof. For the mounting system still to be explained, the cross rails 2 as shown should run in a cross direction to the inclined girders 3. Correspondingly on a pitched roof, the cross rails would be aligned in a cross direction to the slope line of the pitched roof. In a slanted arrangement, cross rails can also be recognized in that the latter run in different heights horizontally or approximately horizontally. In case of a terrain that is considerably slanting in an east west direction, the cross rails can also significantly deviate from the horizontal. In each case, the arrow 7 is, for example, aligned with the direction of the downwards running edges of the PV modules 1, independently from the slope line.

FIG. 1 and FIG. 2 also show that each PV module 1 is connected with two of the cross rails 2 via four holders 5, wherein each of that two cross rails 2 is associated or allocated by two of the holders 5. As will be explained in more detail in FIG. 4, the holders 5 are fixed or attached to the back side 11 of the respective PV module 1 by using an adhesive. The holders 5 are arranged at a distance to the outer contour 4 at positions within the inner or interior surface area of the back side of the respective PV module 1. According to the theory of Bessel, the positions are thereby arranged at a distance from the outer contour 4 of the PV module 1 inwardly by a factor of 0.22 times the side length towards the respective opposite module edge which is illustrated by the distance arrows d1 and d2. The PV module 1 which is supported by the holders 5 thus undergoes a deflection and/or bending load that is as low as possible. The holders 5 have, for example, yet been adhesively affixed in an industrial manufacturing process onto the back side of the PV modules 1 in a factory-provided manner.

Figure 3:
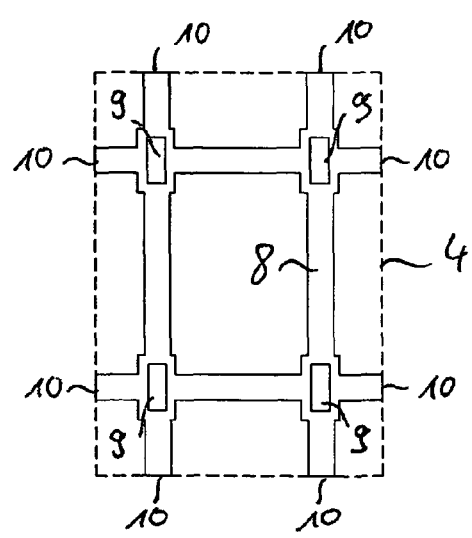
FIG. 3 is a top view onto a mounting template.

It is also possible to connect the holders 5 provisionally by using a mounting template 8 according to FIG. 3 with a PV module 1. The mounting template 8 can be made from a plane metal sheet and be designed grid-like and comprises limit stops 10 at the outer edges thereof by which the mounting template 8 can always be placed congruently onto a PV module 1 or rather can be attached to the outer contour 4 thereof that is illustrated by means of a dashed line. The mounting template 8 also comprises four openings 9 that correspond to the holders 5 format and which are arranged at the positions defined for the holders 5. By means of insertion into the openings 9, the holders 5 can be positioned in a precise and simple manner on a construction site and can be fixed to the back side of the PV module 1, for example, by using double sided adhesive pads. It is also possible that the mounting template 8 also determines the thickness of the adhesive layer 12 according to FIG. 4.

Figure 4:
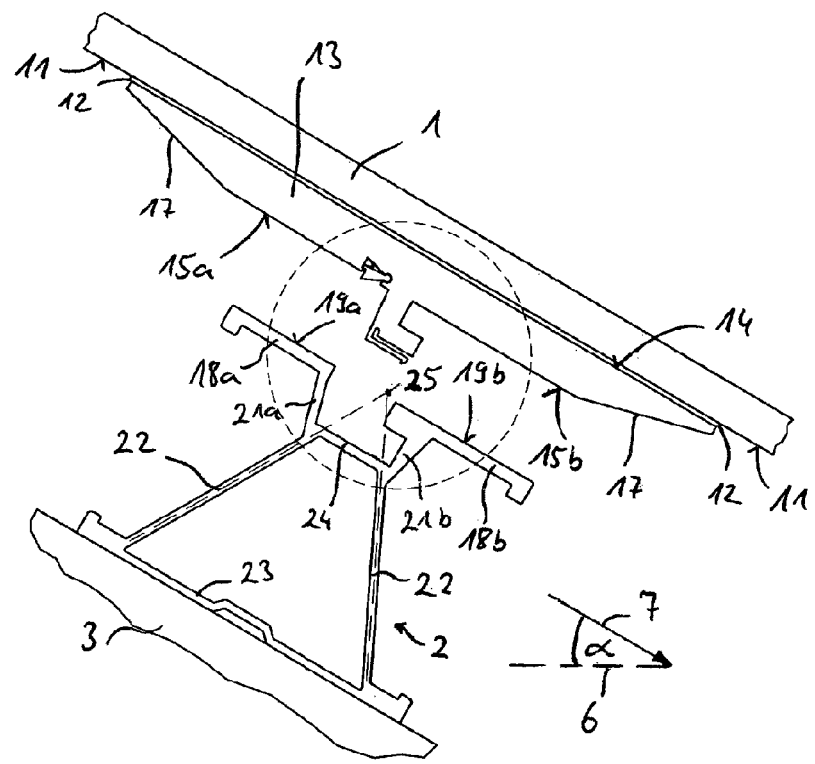
FIG. 4 shows a mounting system according to FIG. 1 prior to the joining process.

FIG. 4 shows the mounting system according to the present invention comprising the cross rail 2 and the holder 5 together with the PV module 1 at the position D1 according to FIG. 1 and FIG. 2 prior to the joining process. As can be seen, the holder 5 comprises a flat plate-like supporting body 13 or structure that is limited by a plane adhesion surface 14 on top and by a plane contact surface 15 *a, b* at the bottom. The adhesion surface, or surface for adhesion, 14 and the contact surface 15 *a, b* are parallel to each other and are spaced flat. As can be seen from FIG. 2, the adhesion surface 14 has a rectangular format and an area of about 60×150 mm in the present embodiment. In this connection, flat or plane particularly means that the material thickness of the supporting body 13, here, for example, of about 8 mm, is significantly smaller, for example, smaller by a multiple more like in case of plates, than the length of the rectangular sides of the adhesion surface 14. Due to static reasons, the longitudinal edges of the adhesion surface 14 are also aligned in parallel to the longitudinal edges of the rectangular PV module 1.

The holder 5 can be fixed to the plane back side 11 of the PV module 1 at its adhesion surface 14 by using an adhesive agent. The adhesive agent can be schematically seen as a flat adhesive layer 12 between the back side 11 of the PV module 1 and the adhesion surface 14. As the holder 5 can, for example, be made of a metal material, for example, of an aluminum, and the back side 11 of the PV module 1, designed in form of a frameless thin-film module, can usually be made of glass, a two-component silicone adhesive that has been proven for the said material combination in construction engineering and for outdoor environment can be used for adhesive fixing. Such an adhesive can also have a cushioning and stress-compensating effect.

It can also be seen that the supporting body 13 comprises a trapezoid-like cross section, wherein the contact surface 15 is smaller than the adhesion surface 14 and is arranged approximately in the center and beyond the adhesion surface 14. The material thickness of the supporting body 13 thus reduces continuously beginning from the left and the right edge of the contact surface 15 a, b towards the left and the right edge of the adhesion surface 14 by means of two slants 17. By this diminution, the rigidity of the holder 5 also reduces towards the outside, thereby avoiding a sudden rigidity alteration between the supported and the unsupported area of the PV module 1. Alterations in rigidity and local stress peaks resulting therefrom can thus effectively be avoided, preserving the PV module 1, for example, against high wind and snow loads.

The cross rail 2 associated with the holder 5 is also shown in FIG. 4. The cross rail 2 comprises a special cross section that is uniform over the entire length thereof. The cross section can be divided into two areas. A lower area providing a high supporting strength for load transmission and an upper area having special retaining features for mounting the holders 5.

In the upper area of the cross rail 2, two bars 18 a, b projecting at the left and at the right side, the bars 18 a, b each provide a partial surface of a common plane supporting surface 19 a, b towards the top. The supporting surface 19 a, b is interrupted approximately in the center by the opening slot of an undercut longitudinal groove 20. The side walls 21 a and 21 b of the said undercut longitudinal groove 20 connect the projecting bars 18a, b with the lower area of the cross rail 2. There, the cross rail 2 comprises a trapezoid-like hollow section having a slant bar 22 both at the left side and at the right side as well as having a bottom chord 23 and a top chord 24. The bottom chord 23 and the top chord 24 are arranged in parallel to each other, wherein the bottom chord 23 is broader than the top chord 24. By means of the bottom chord 23, the cross rail 2 rests on the inclined girder 3 according to FIG. 1 and FIG. 2 in a cross direction thereto. The bottom chord 23 also serves to fix the cross rail 2 to the inclined girder 3, whereby extensions are formed on both sides of the bottom chord 23 that are tangible by clamps not explicitly shown here. The top chord 24 is also the bottom of the undercut longitudinal groove 20. The two slant bars 22 are inclined inwardly in an angle of 60 degrees and intersect in their extension represented by means of a dashed line in an intersection line 25 which can be seen as a point. Intersection line 25 runs approximately in the center between the two parts of the supporting surface 19 a, b. Side walls 21 a and 21 b of the undercut longitudinal groove 20 form an approximately X-shaped cross section together with the two slant bars 22. Although the cross rail 2 has statically optimized supporting properties, it is possible to reduce the cross rail 2 to the upper area provided for mounting the holders 5 and to attach it onto another suitable supporting structure such as, for example, a lattice girder or a wooden beam.

FIG. 4 also shows that not only the cross rail 2 but also the holder 5 has an extrudable form and can thus, for example, be manufactured by using an extrusion molding method. Being substantially embodied in form of extrusion molded parts, the holders 5 can be easily produced even in different widths by cutting of only one profile string and thus be adapted to different formats and supporting properties of PV modules when indicated. It can also be seen that once the holder 5 is placed on the top surface of the inclined girder 3, the supporting surfaces 19 a, b, the contact surface 15 a, b, the adhesion surface 14 and the back side 11 of the PV module 1 are in parallel to each other.

Figure 5:
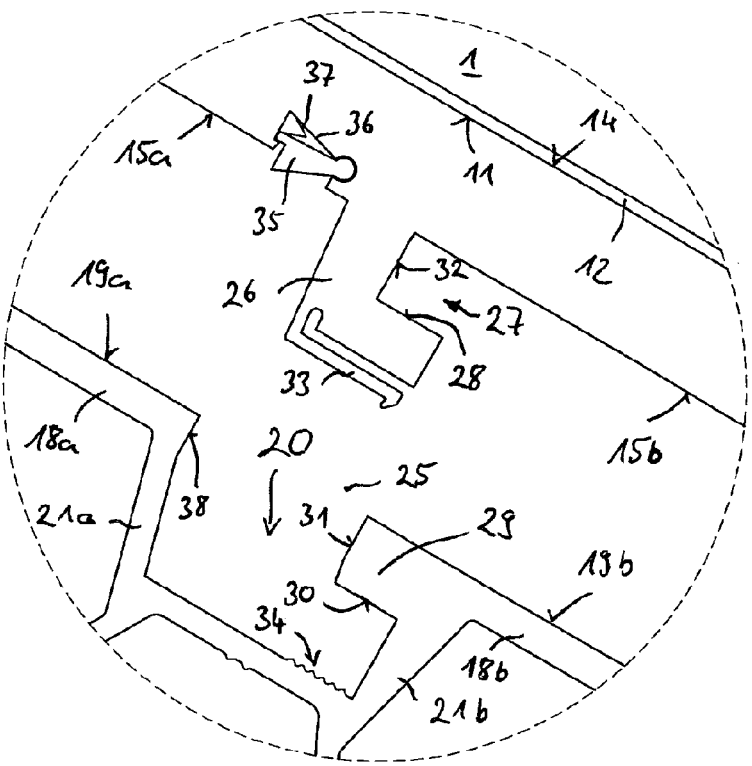
FIG. 5 shows a detail of the mounting system according to FIG. 4.

FIG. 5 shows, for example, a rigid hook 26 sticking out from the contact surface 15 a, b, approximately in the center thereof. The hook 26 is designed as an L-shaped rail, not shown in detail, running over the entire width of the holder 5 according to its cross section. The hook 26 comprises an undercut, i.e., a recess 27 in form of a groove arranged between the hook's 26 hook protrusion and the contact surface 15 b. The recess 27 has a rectangular cross section and is limited by the contact surface 15 a, b at its top side and by a flank 28 being parallel thereto at its bottom side. The counterpart of the recess 27 is the protrusion 29 provided at the cross rail 2 and designed in the form of an overhang of the undercut longitudinal groove 20. The protrusion 29 also has a rectangular cross section and is limited by the supporting surface 19 b at its top side and by a flank 30 being parallel thereto at its bottom side. The rectangular cross sections of the recess 27 and of the protrusion 29 correspond to each other. And as can be seen in the following FIG. 8 and FIG. 9, the recess 27 and the protrusion 29 can be shifted into each other in a form-fitting manner, wherein the joining path runs inclined downwards in the direction of the arrow 7. The front side 31 of the protrusion 29 here acts, for example, as an end stop for the back side 32 of the recess 27.

FIG. 5 also shows in detail that a snap-fit hook 33 in the form of a bendable bar having a snap-fit hook sticking out is additionally provided at the rigid hook 26. The snap-fit hook 33 is integrally attached in the area of the head of the rigid hook 26 and also runs, not shown in detail, over the entire width of the holder 5 according to its cross section. The counterpart of the snap-fit hook 33 is a row 34 of teeth integrated within the bottom of the undercut longitudinal groove 20. The single teeth or elevations of the row 34 of teeth are running in parallel to the cross rail 2. The joining direction of the snap-fit, or snap-in, connection thereby corresponds to the joining direction of the aforementioned recess 27 and the protrusion 29 according to arrow 7.

A blocking element embodied as a latch 35 can also be seen in FIG. 5. The latch 35 can be pivotably turned in and out of a recess within the contact surface 15 a. By means of a spring element 37, the latch 35 can be pretensioned in a stable blocking position against a small limit stop provided at the side of the recess 36. In the release position according to FIG. 7, the latch 35 can be completely turned into the recess 36 such that the latch 35 does not protrude from the contact surface 15 a. In its blocking position, the latch operates together with a limit stop 38 provided at the left side of the undercut longitudinal groove 20 as can be seen from FIG. 9. Holder 5—except to the latch 35 and the spring element 37—is designed as an extrusion molded part, wherein the hook 26 having the recess 27, the snap-fit hook 33 and the recess for the latch 35 have already been integrated by means of extrusion.

FIGS. 6 to 9 illustrate the joining process of the mounting system, i.e. how the holder 5 is mounted into the upper area of the cross rail 2. The PV module 1 and the adhesive layer 12 are not shown. The reference numerals according to FIG. 1 to FIG. 5 additionally apply. For better comparability of the single joining positions, the mounting system is represented horizontally in the drawings, wherein the position according to FIG. 6 corresponds to the position according to FIG. 5. For reasons of clarity, the arrow 7 representing the slope line, the inclination angle α of 30 degrees and a further horizontal plane 6 are shown.

Figure 6:
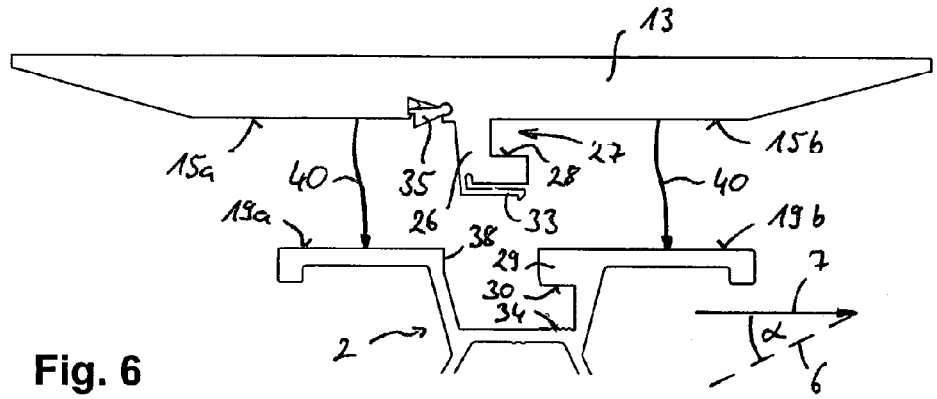
FIG. 6 to FIG. 9 illustrate the joining process of the mounting system according to FIG. 4.

FIG. 6 illustrates an initial position prior to the joining process, in which, for example, two assemblers manually hold the PV module 1 at a distance above the cross rail 2. It can be seen that the latch 35 is turned out of the recess 36 and the snap-fit hook 33 is relaxed. After performing a first freehand motion 40 for placing the holder 5, the position according to FIG. 7 is reached.

Figure 7:
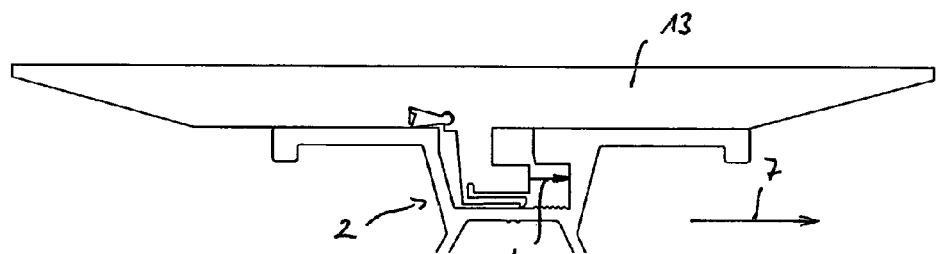

According to FIG. 7, the holder 5 is now placed with its contact surface 15 a, b onto the supporting surface 19 a, b of the cross rail 2 having a sufficiently plane contact and thus resting in a statically appropriate way. While placing the holder 5, the hook 26 is inserted into the undercut longitudinal groove 20 of the cross rail 2. In order to allow distance tolerances to the parallel adjacent cross rail 2 according to FIG. 1, the undercut longitudinal groove 20 is accordingly designed wider than the hook 26. It can also be recognized that the latch 35 has been turned into the release position under the tension of the spring 37, that is here not shown in detail, while placing the holder 5 onto the supporting surface 19. In this position, a free shift of the holder 5 on the supporting surface 19 a, b both in and against the slope line 7 by a small extent for compensating distance tolerances is possible without thereby inter-engaging the recess 27 and the protrusion 29. The snap-fit hook 33 also abuts against the bottom of the undercut longitudinal groove 20 so that the snap-fit hook 33 is somewhat pretensioned. In this position, it is also, for example, easy to shift the PV module 1 on the supporting surfaces 19 a, b parallel to the cross rails 2, if necessary, into a proper mounting position, for example, in order to obtain a determined distance to an adjacent PV module.

A second joining motion 41 finalizes the joining process and is carried out by means of shifting the holder 5 perpendicular to the cross rail 2 and parallel to the supporting surface 19 a, b in the direction of the arrow 7 downwards. Recess 27 of the hook 26 thereby is shifted over the protrusion 29 of the cross rail 2 in a proper form-fitting manner, wherein an appropriate sliding clearance is provided between the flank 28 of the recess 27 and the flank 30 of the protrusion 29. Recess 27 and the protrusion 29 should be engaged with each other not only by means of a simple hook connection but also by means of a kind of groove-tongue-connection comprising a sliding fit. The sliding fit between the holder 5 at its contact surface 15 a, b as well as the opposite flank 28 parallel thereto and the cross rail 2 at its supporting surface 19 a, b as well as the opposite flank 30 parallel thereto is present over the whole compensating range. The holder 5 and the cross rail 2 are thus guided to one another between the maximum positions according to FIG. 8 and FIG. 9 along said surfaces. The protrusion 29 is also limited by the supporting surface 19 a; and the recess is also limited by the contact surface 15 a. During the inter-engagement process of the recess 27 and the protrusion 29, there occurs a sliding fit overlap preventing a lifting off of the holder 5 from the cross rail 2. The overlap is dimensioned such that distance tolerances of, for example, ±2 mm can be compensated between the two cross rails 2 and/or the respective holders 5 according to FIG. 1 and FIG. 2.

During the second joining motion 41, the snap-fit hook 33 additionally engages into the row 34 of teeth. To this the length of the row 34 of teeth is adapted to the size of the desired tolerance compensation. Depending on the length of the shift, i.e., depending on the deviation from the nominal distances between two adjacent cross rails 2 and/or the holders 5, the snap-fit hook 33 can thereby take on one of several successive joining positions, wherein a grid spacing for the row 34 of teeth of less than one millimeter is here provided. The snap-fit connection of the snap-fit hook 33 and the row 34 of teeth accordingly provides a finely sub-divided arresting possibility effectively inhibiting an unintended shift or a motion play, both in and against the direction of the arrow 7. However, the snap-fit connection allows disassembling such that the snap-fit connection of all four holders 5 can be overcome by using sufficiently high manual force. It is also conceivable to block a motion against the second joining motion 42 and the arrow 7, when using an appropriate asymmetrical design of the tooth flanks, for example, when using a saw tooth profile design. During the second joining motion 41, the latch 35 additionally turns out of the recess 36, for example, in the position in which the snap-fit hook 33 reaches the first joining position on the row 34 of teeth. After the second joining motion 41, the holder 5 can be shifted either as far as the bottom 32 of the recess abuts against the front side 31 of the protrusion 29 according to FIG. 8 or, as this is effected at an opposite holder 5, of the parallel adjacent cross rail 2. Alternatively or additionally, the front side of the hook protrusion can abut against the opposite side wall 21 b of the undercut longitudinal groove 20.

Figure 8:
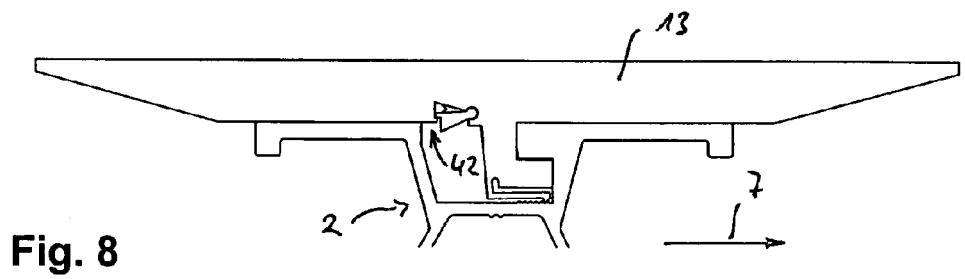

FIG. 8 shows the mounting system in a first of two maximum positions. A further shifting inclined downwards in the direction of the arrow 7 is not possible any more. It can also be seen that the snap-fit hook 33 rests in the last joining respectively snap-fit position of the row 34 of teeth. This position can be reached when the two adjacent cross rails 2 are spaced from each other by the nominal distance. It is also conceivable that the shown position will firstly be reached long after the mounting process, for example, when the module is powerfully pushing downwards due to snow load. In this position, the foot of the hook 26 is also arranged in a statically appropriate way approximately in the center of the intersection line 25 of the cross rail 2 according to FIG. 4. It can also be seen that the latch 35 has now been turned out. If the snap-fit connection should be overcome upwards, for example, due to a theft attempt or in case of particularly high wind suction, according to FIG. 9, the latch 35 abuts against the limit stop 38 arranged at the left side of the undercut longitudinal groove 20 of the cross rail 2. The distance 42 that can be seen from FIG. 8 between the latch 35 and the limit stop 38 is thereby as large as the desired tolerance compensation.

Figure 9:
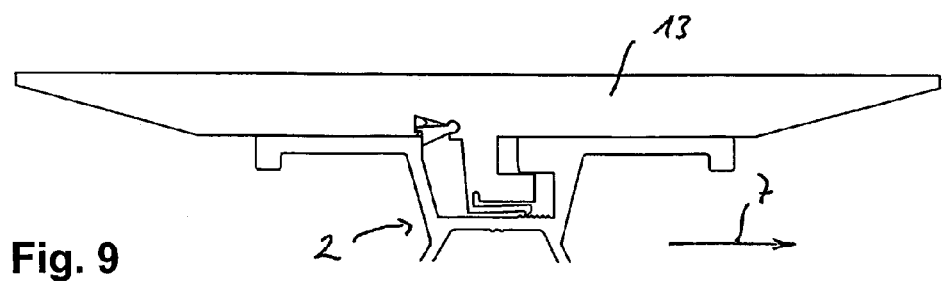

FIG. 9 shows the mounting system in the second maximum position. The latch 35 abuts to the limit stop 38, whereby further shifting against the original joining motion 41 is blocked and, thus, dismounting the holder 5 out of the cross rail 2 is not possible without further efforts. A special tool is required for releasing the latch 35. In practice, the holder 5 will abut to the cross rail 2 according to FIG. 8 or, due to distance tolerances, will be located between the two maximum positions according to FIG. 8 and FIG. 9. The sliding fit overlap between the recess 27 and the protrusion 29 should always remain when compensating said tolerances so that the holder 5 and the PV module 1 cannot lift off undesirably from the supporting surface 19 a, b even under extreme wind conditions. With respect to FIG. 8 and FIG. 9, it can further be seen that the contact surface 15 a, b is dimensioned such that the latter covers the supporting surface 19 a, b in a statically appropriate manner over the entire shifting extent. It goes without saying that adjacent holders and the cross rails associated therewith have a corresponding distance according to FIG. 1.

Figure 10:
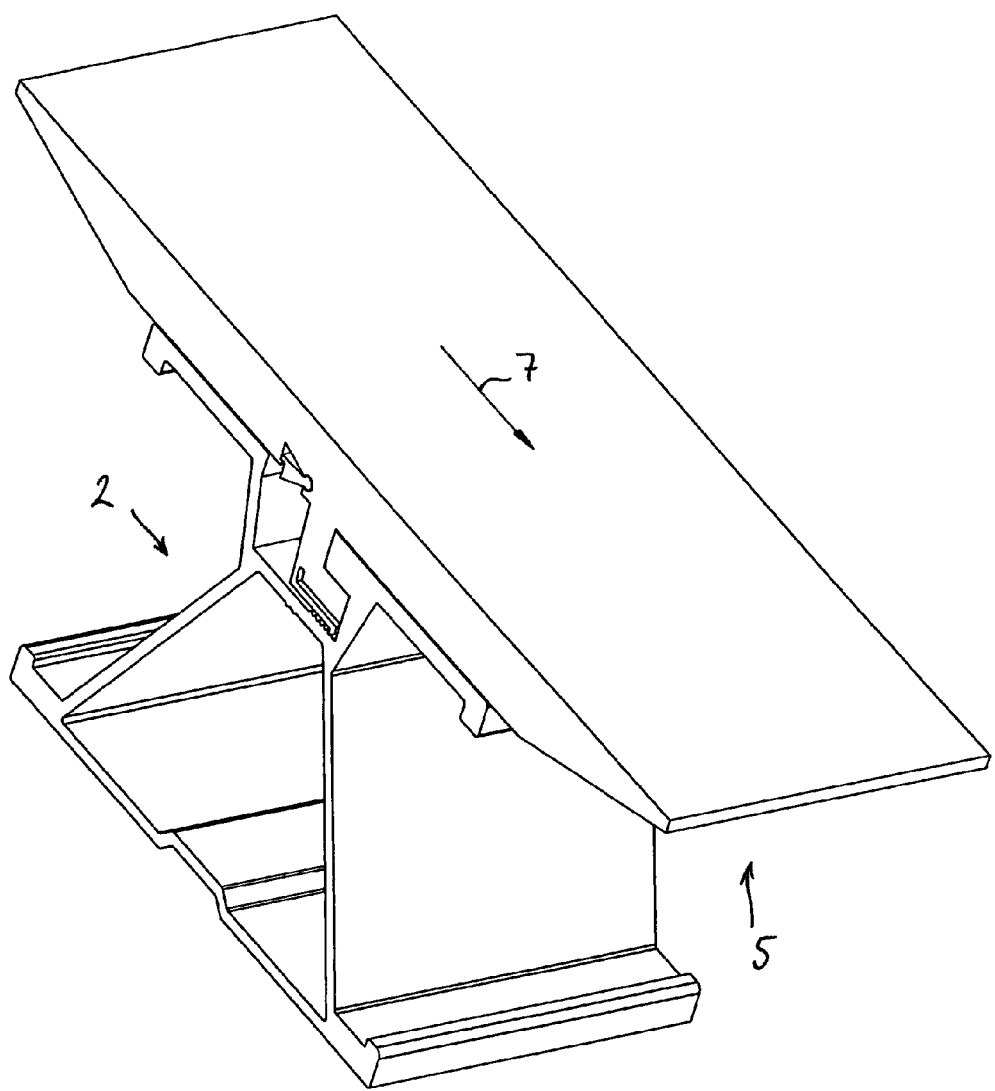
FIG. 10 is a perspective view onto the mounting system according to FIG. 1.

For illustration purposes, FIG. 10 shows the cross rail 2 and the holder 5 of the mounting system according to the present invention in the maximum position according to FIG. 8 in a perspective view. The cross rail 2 is here only shown in the area of the holder 5. The aforementioned reference numerals correspondingly apply.

Figure 11:
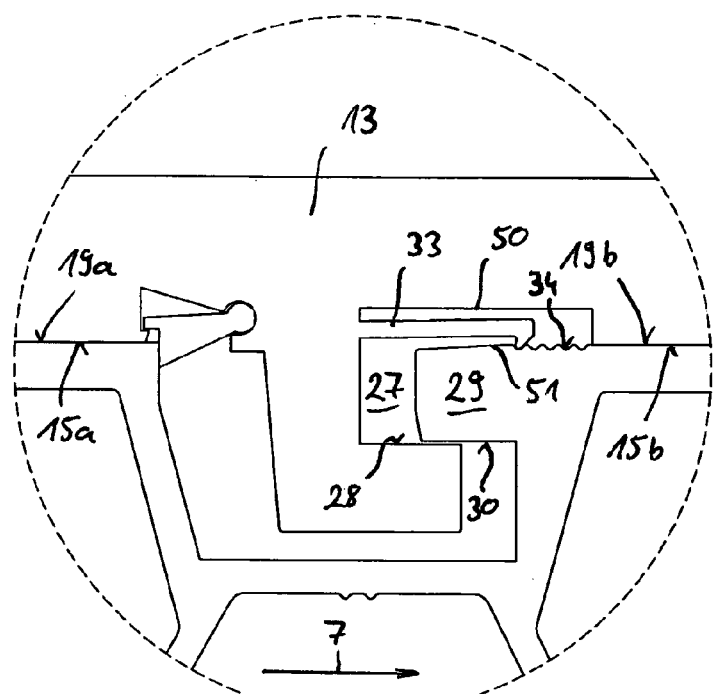
FIG. 11 shows a variant of the mounting system according to FIG. 1 in a detailed view.

FIG. 11 shows an embodiment of the mounting system according to FIG. 1 to FIG. 10 as regards the snap-fit connection. Unless not shown otherwise, the reference numerals correspondingly apply. The shown position corresponds to the position according to FIG. 9. It can be seen that the snap-fit connection consisting of the elastic snap-fit hook 33 and the rigid row 34 of teeth is now arranged at the level of the contact surface 15 b and of the supporting surface 19 b, respectively. To this, the snap-fit hook 33 sticks out from the foot of the rigid hook 26 approximately perpendicular and is received by a recess 50 in the supporting body 13 that is open to the contact surface 15 b. The row 34 of teeth is integrated within the supporting surface 19 a of the cross rail 2. The snap-fit hook 33 and the row 34 of teeth can be engaged with each other in several successive joining positions in the direction of the arrow 7 such as is described in FIG. 4 to FIG. 9. Opposite to the flank 28, the recess 27 of the holder 5 is limited by the snap-fit hook 33. Opposite to the flank 30, the protrusion 29 of the cross rail 2 is limited by an insertion slant 51 and subsequently by the row 34 of teeth. The recess 27 and the protrusion 29 accordingly do not only engage with each other in a form-fitting manner, but in a force-transmitting and form-fitting manner. However, a sliding fit for deviations of nominal distances in the desired compensation range is provided between the contact surface 15 a, b as well as the diagonally opposite flank 28 on the side of the holder 5 and the supporting surface 19 a, b as well as the opposite flank 30 on the side of the cross rail 2. The holder 5 and the cross rail 2 are guided to one another along those surfaces while interengaging. The advantage of this embodiment is that the snap-fit hook 33 is protected from damage within the recess 50. The plane head surface of the hook 26 is also better for stapling and packaging, for example, if the holders 5 have already been pre-assembled at the PV module 1 in a factory-provided manner.

Figure 12:
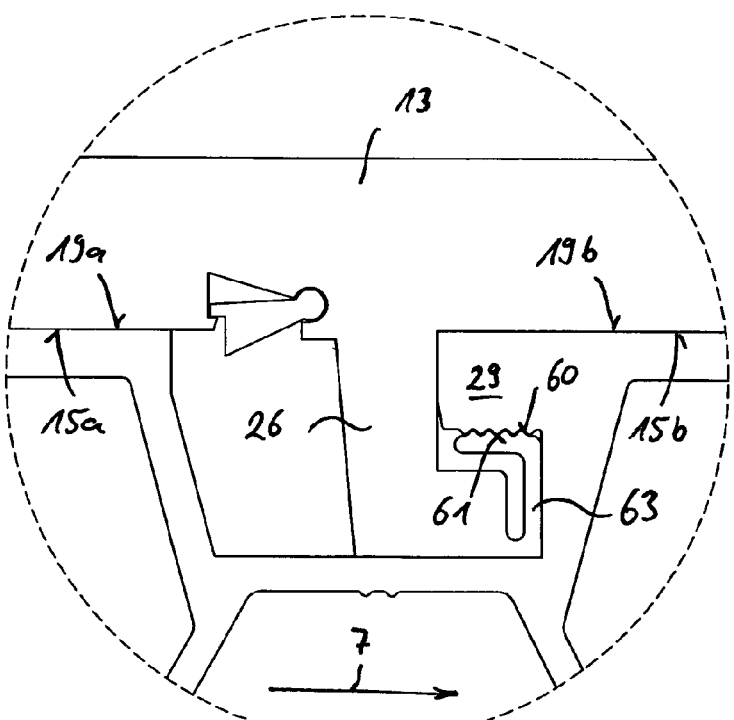
FIG. 12 shows a variant of the mounting system according to FIG. 1 in a detailed view.

FIG. 12 shows a further embodiment of the mounting system according to FIG. 1 to FIG. 10 as regards the snap-fit connection. Unless not shown otherwise, the reference numerals correspondingly apply. The shown position corresponds to the position according to FIG. 8. The snap-fit connection comprises a row 61 of teeth elastically arranged at the hook 26 and a row 62 of teeth rigidly arranged at the protrusion 29. The rows of teeth 61 and 62 can be engaged in several joining positions, wherein the joining positions succeed each other again in the direction of arrow 7. For elastically arranging the row 61 of teeth, there is provided a bendable bar 63 that is arranged at the hook protrusion of the hook 26 and bears the row 61 of teeth. Together with the contact surface 15 b, the row 61 of teeth hereby limits a recess of the hook 26 that is filled with the protrusion 29 in the position as shown. The row 61 of teeth represents the lower flank of the said recess and is opposite to the supporting surface 19 b. The protrusion 29 is limited by the rigid row 61 of teeth at its lower flank and furthermore at the opposite side by the supporting surface 19 b. A further difference of this embodiment is that the holder 5 also abuts with the head of its hook 26 against the bottom of the undercut longitudinal groove 20. This can also have static advantages.

Figure 13:
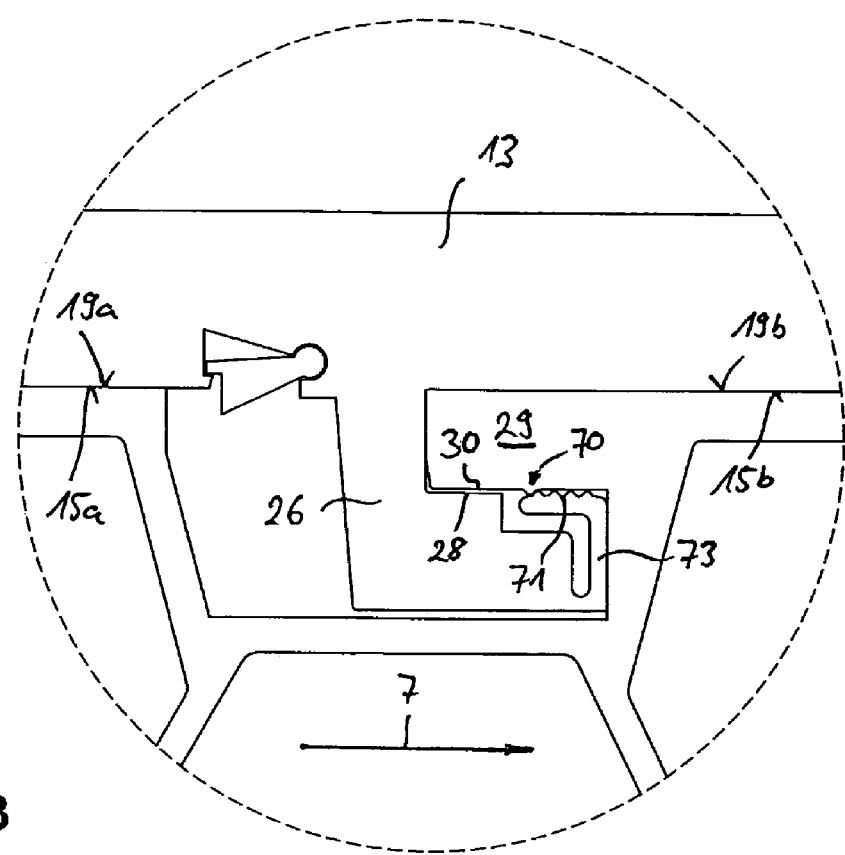
FIG. 13 shows a variant of the mounting system according to FIG. 1 in a detailed view.

FIG. 13 shows a further embodiment of the mounting system according to FIG. 1 to FIG. 10 as regards the snap-fit connection. Unless not shown otherwise, the reference numerals correspondingly apply. The position shown corresponds to the position according to FIG. 8. The snap-fit connection comprises a snap-fit hook 70 sticking out from the lower flank 30 of the protrusion 29. A row of teeth 71 acts as a counterpart and being arranged elastically at the hook 26 via a bendable bar 73 such as the row of teeth 60 according to FIG. 12. A difference to the embodiment according to FIG. 12 is that the snap-fit connection is followed by a sliding fit between the two flanks 30 and 28 such that the recess of the hook 26 and the protrusion 29 of the cross rail 2 are additionally engaged with each other in a form-fitting manner as described in FIG. 4 to FIG. 9. The hook protrusion and the undercut longitudinal groove 20 are thus accordingly provided broader. The bendable bar 73 can also tension the holder 5 against the supporting surface 19 a, b.

Figure 14:
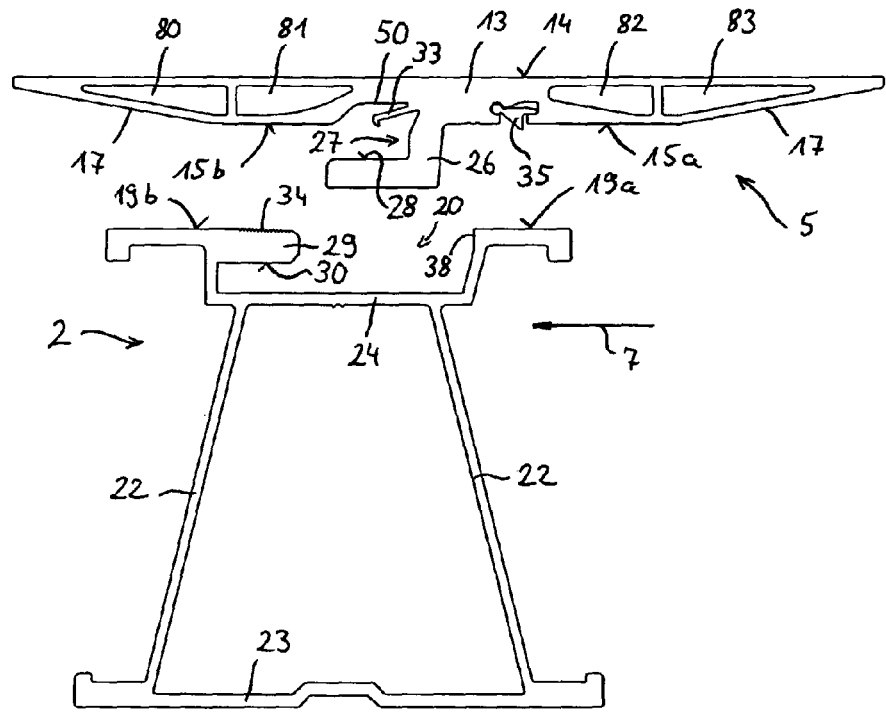
FIG. 14 and FIG. 15 show a variant of the mounting system according to FIG. 1.
Figure 15:
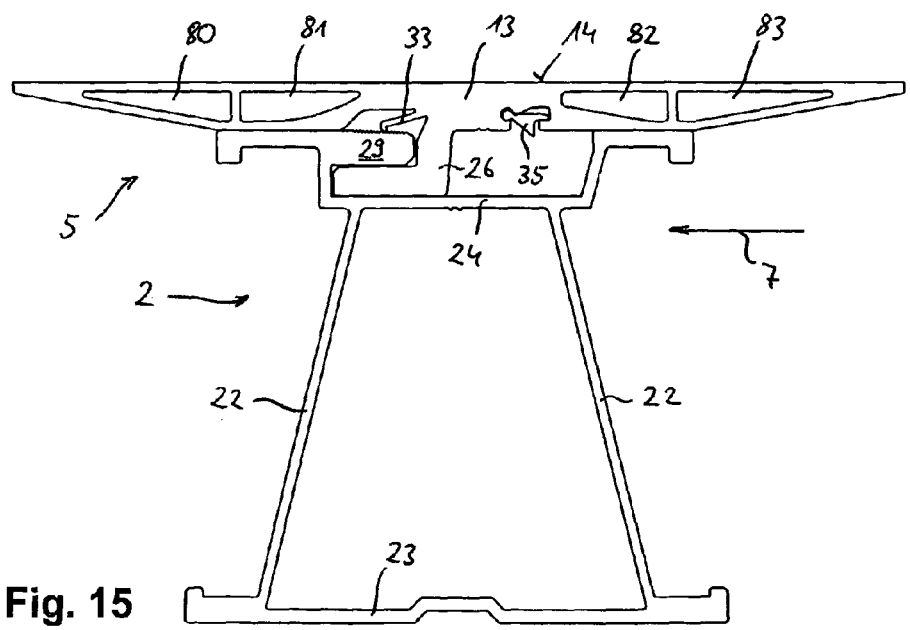

FIG. 14 and FIG. 15 show the cross rail 2 and one holder 5 of a further mounting system prior to the joining process and after the joining process. The mounting system is comparable to the embodiment according to FIG. 11 such that only important common features and differences will be explained and the reference numerals analogously apply. The supporting body 13 of the holder 5 comprises four continuous recesses 80, 81, 82 and 83. By means of the recesses 80, 81, 82 and 83, the holder 5 or rather its supporting body 13 can be designed in a more lightweight and more material-saving way. Similar to the holder according to FIG. 11, a hook 26 again sticks out from the contact surface 15 a, b of the holder 5. The holder 5 also comprises a recess 27 being designed in form of an undercut of the hook 26, wherein the upper side of the recess 27 opposite to the flank 28 is comparably formed by a snap-fit hook 33. The snap-fit hook 33 is integrally attached at the bottom area of the hook 26 and, in this embodiment, is inclined by an angle of about 15° with respect to the contact surface 15 a, b. The snap-fit hook 33 is also again received within a recess 50 in the supporting body 13, wherein the recess 50 is open to the contact surface 15 b. Similarly to the cross rail according to FIG. 4, the cross rail 2 of the mounting system according to FIG. 14 and FIG. 15 comprises a trapezoid-like cross section, having a top chord 24 and a broader bottom chord 23 being parallel thereto as well as having two bars 22 directed slantingly inwards. In the upper area of the cross rail 2 between its supporting surface 19 a, b and the top chord 24, there is also again provided an undercut longitudinal groove 20 having an opening slot that is here relatively broad. The overhang of the undercut longitudinal groove 20 provided at the left side operates as the protrusion 29 for the recess 27 of the hook 26. The maximum engagement between the recess 27 and the protrusion 29 is, in this embodiment, larger than one centimeter, wherein there is a sliding fit for deviations from the nominal distances within the desired compensation range provided between the contact surface 15 a, b as well as the diagonally opposite flank 28 on the side of the holder 5 and the supporting surface 19 a, b as well as the opposite flank 30 on the side of the cross rail 2. In the area of the protrusion 29, one section of the supporting surface 19 b is designed as the row 34 of teeth interacting with the snap-fit hook 33 and forming a snap-fit connection therewith, the snap-fit connection having several joining positions successively in the direction of the arrow 7. The direction of the arrow 7 again represents the direction of the downwardly running outer edges of the PV modules 1 and/or of the direction of the downhill force thereof. Opposite to the embodiment according to FIG. 5, the row 34 of teeth is designed in a slightly inclined manner and thus at the same time it operates as an insertion slant for the snap-fit hook 33. Instead of using a separate spring element such as in case of the holder according to FIG. 5, the latch 35 in this embodiment itself consists of an elastic material, for example, of EPDM rubber, wherein the latch 35 is mounted in the area of its recess such that latch 35 can be turned in by elastic self-deformation and accordingly turn out automatically. The holder 5 is also substantially embodied as an extrusion molded part, as stated above. This means that the latter including the recesses 80, 81, 82 and 83, the hook 26 and the snap-fit hook 33 can be manufactured by means of cutting off from a correspondingly extrusion molded profile and almost without any post-processing. Only the latch 35 that is also embodied as an extruded part should be manufactured separately and should be inserted into the recess 50 within the holder 5.

The present invention is not limited to embodiments described herein; reference should be had to the appended claims.

The invention claimed is:

1. A mounting system for a PV module, the mounting system comprising:
    at least two profile-shaped cross rails arranged parallel to each other and being configured to hold a plurality of the PV modules, wherein each of the profile-shaped cross rails includes plane supporting surfaces; and
    at least two holders, each of the holders being configured to be attached or be attachable to a back side of the PV module via an adhesive agent,
    wherein,
    the PV module is configured to be mounted to the at least two profile-shaped cross rails via the at least two holders, whereby each profile-shaped cross rail is allocated to at least one holder and either each holder includes a recess and each profile-shaped cross rail includes an integrated protrusion or each holder includes a protrusion and each profile-shaped cross rail includes an integrated recess,
    the PV module is configured to be mounted by placing the PV module onto the at least two profile-shaped cross rails so that the at least two holders lay flat on the plane supporting surfaces of the at least two profile-shaped cross rails, the PV module then being moved in a joining direction perpendicular to the profile-shaped cross rails while lying on the plane supporting surfaces so that either the recess engages with the integrated protrusion or the protrusion engages with the integrated recess,
    a retaining safety device is disposed between at least one profile-shaped cross rail and its corresponding holder, the retaining safety device being configured to counteract a move against the joining direction, and
    the at least two holders each comprise a flat supporting structure having a contact surface and a surface for adhesion parallel thereto, the flat supporting structure narrowing towards an outer edge of the surface for adhesion.

2. The mounting system as recited in claim 1, wherein the at least two holders are arranged at a distance from an outer contour of the PV module at positions within an interior surface area of the back side of the PV module.

3. The mounting system as recited in claim 1, wherein the plane supporting surfaces of the profile-shaped cross rails form a common inclined plane with the joining direction running downwards parallel to the common inclined plane.

4. The mounting system as recited in claim 1, wherein the flat supporting structure includes a trapezoid-like cross section or is formed like a truncated pyramid or a truncated cone.

5. The mounting system as recited in claim 1, wherein the holder comprises a hook and the recess of the holder is an undercut of the hook, or the profile-shaped cross rail comprises a hook and the integrated recess of the profile-shaped cross rail is an undercut of the hook.

6. The mounting system as recited in claim 5, wherein the hook of the holder extends from the holder's contact surface or the hook of the profile-shaped cross rail extends from the profile-shaped cross rail's plane supporting surface.

7. The mounting system as recited in claim 1, wherein the integrated protrusion of the profile-shaped cross rail or the protrusion of the holder are configured as an overhang of an undercut groove.

8. The mounting system as recited in claim 7, wherein the undercut groove of the holder or of the profile-shaped cross rail further comprises an opening slot, wherein the opening slot is configured to divide the contact surface of the holder or the plane supporting surface of the profile-shaped cross rail.

9. The mounting system as recited in claim 1, wherein the contact surface and an opposite flank arranged parallel to the contact surface at the protrusion or at the recess of the holder, and the plane supporting surface and an opposite flank arranged parallel to the plane supporting surface at the integrated protrusion or at the integrated recess of the profile-shaped cross rail, are configured so as to provide a sliding fit between the holder and the profile-shaped cross rail.

10. The mounting system as recited in claim 1, wherein the retaining safety device comprises a snap-in connection comprising several successive joining positions, wherein the snap-in connection is configured to provide arresting retaining safety between the at least one profile-shaped cross rail and its assigned holder.

11. The mounting system as recited in claim 10, wherein the snap-in connection includes a row of teeth integrated into the at least one profile-shaped cross rail and a snap-in hook elastically disposed at the holder, wherein the snap-in hook is configured to interact with the row of teeth.

12. The mounting system as recited in claim 10, wherein the integrated protrusion comprises a flank, the recess comprises a flank, the snap-in connection is arranged at the flanks of the integrated protrusion and/or at the flank of the recess, and/or is arranged to limit the integrated protrusion and/or the recess.

13. The mounting system as recited in claim 1, wherein the retaining safety device comprises a blocking element arranged at at least one of the holders, wherein the blocking element is configured, in a release position, to allow a shift of the holder on the plane supporting surface of the profile-shaped cross rail assigned thereto in the joining direction, and, in a blocking position, to block a shift against the joining direction.

14. The mounting system as recited in claim 13, wherein the blocking element includes a latch disposed at the holder, the latch being configured to interact with a limit stop at the profile-shaped cross rail.

15. The mounting system as recited in claim 14, wherein the latch, in the release position, is turned into a contact surface recess arranged within the contact surface of the holder and, in the blocking position, is abuttable against the limit stop of the profile-shaped cross rail.

16. The mounting system as recited in claim 1, wherein two profile-shaped cross rails are provided and one, two or three holders are attached to the back side of the PV module for each profile-shaped cross rail.

17. The mounting system as recited in claim 1, wherein each of the profile-shaped cross rails includes a trapezoid-like hollow section with two slant bars.

18. The mounting system as recited in claim 17, wherein an extension of the slant bars intersect in an intersection line in or near the plane supporting surface, the plane supporting surface extending on both sides of the intersection line.

19. The mounting system as recited in claim 1, wherein the holders are provided substantially as extrusion molded parts.

20. The mounting system as recited in claim 1, wherein the joining direction is in a same direction to at least one of a direction of a downhill force of the PV module and to an outer edges of the PV module running downwards.

21. A holder of the mounting system as recited in claim 1.

22. A cross rail of the mounting system as recited in claim 1.

23. An assembly group consisting of:
the PV module as recited in claim 1; and
the holders of the mounting system as recited in claim 1, wherein the holders are adhesively affixed to the back side of the PV module.

24. A mounting system for a PV module, the mounting system comprising:
at least two profile-shaped cross rails arranged parallel to each other and being configured to hold a plurality of the PV modules, wherein each of the profile-shaped cross rails includes plane supporting surfaces; and
at least two holders, each of the holders being configured to be attached or be attachable to a back side of the PV module via an adhesive agent,
wherein,
the PV module is configured to be mounted to the at least two profile-shaped cross rails via the at least two holders, whereby each profile-shaped cross rail is allocated to at least one holder and either each holder includes a recess and each profile-shaped cross rail includes an integrated protrusion or each holder includes a protrusion and each profile-shaped cross rail includes an integrated recess,
the PV module is configured to be mounted by placing the PV module onto the at least two profile-shaped cross rails so that the at least two holders lay flat on the plane supporting surfaces of the at least two profile-shaped cross rails, the PV module then being moved in a joining direction perpendicular to the profile-shaped cross rails while lying on the plane supporting surfaces so that either the recess engages with the integrated protrusion or the protrusion engages with the integrated recess,
a retaining safety device is disposed between at least one profile-shaped cross rail and its corresponding holder, the retaining safety device being configured to counteract a move against the joining direction,
the at least two holders each comprise a flat supporting structure having a contact surface and a surface for adhesion parallel thereto, the flat supporting structure narrowing towards an outer edge of the surface for adhesion, and
the at least two holders each comprise a flat supporting structure having a contact surface and a surface for adhesion parallel thereto, the flat supporting structure including a trapezoid-like cross section or being formed as a truncated pyramid or as a truncated cone.

25. A mounting system for a PV module, the mounting system comprising:
at least two profile-shaped cross rails arranged parallel to each other and being configured to hold a plurality of the PV modules, wherein each of the profile-shaped cross rails includes plane supporting surfaces; and
at least two holders, each of the holders being configured to be attached or be attachable to a back side of the PV module via an adhesive agent,
wherein,
the PV module is configured to be mounted to the at least two profile-shaped cross rails via the at least two holders, whereby each profile-shaped cross rail is allocated to at least one holder and either each holder includes a recess and each profile-shaped cross rail includes an integrated protrusion or each holder includes a protrusion and each profile-shaped cross rail includes an integrated recess,
the PV module is configured to be mounted by placing the PV module onto the at least two profile-shaped cross rails so that the at least two holders lay flat on the plane supporting surfaces of the at least two profile-shaped cross rails, the PV module then being moved in a joining direction perpendicular to the profile-shaped cross rails while lying on the plane supporting surfaces so that either the recess engages with the integrated protrusion or the protrusion engages with the integrated recess,
a retaining safety device is disposed between at least one profile-shaped cross rail and its corresponding holder, the retaining safety device being configured to counteract a move against the joining direction,
the at least two holders each comprise a flat supporting structure having a contact surface and a surface for adhesion parallel thereto, a material thickness of the flat supporting structure diminishing from a central area of the flat supporting structure to at least one outer edge of the surface for adhesion towards an outer edge of the surface for adhesion, and
the at least two holders each comprise a flat supporting structure having a contact surface and a surface for adhesion parallel thereto, a material thickness of the flat supporting structure diminishes from a central area of the flat supporting structure to an outer edge of the surface for adhesion.

26. A mounting system for a PV module, the mounting system comprising:
at least two profile-shaped cross rails arranged parallel to each other and being configured to hold a plurality of the PV modules, wherein each of the profile-shaped cross rails includes plane supporting surfaces; and
at least two holders, each of the holders being configured to be attached or be attachable to a back side of the PV module via an adhesive agent,
wherein,
the PV module is configured to be mounted to the at least two profile-shaped cross rails via the at least two holders, whereby each profile-shaped cross rail is allocated to at least one holder and either each holder includes a recess and each profile-shaped cross rail includes an integrated protrusion or each holder includes a protrusion and each profile-shaped cross rail includes an integrated recess,
the PV module is configured to be mounted by placing the PV module onto the at least two profile-shaped cross rails so that the at least two holders lay flat on the plane supporting surfaces of the at least two profile-shaped cross rails, the PV module then being moved in a joining direction perpendicular to the profile-shaped cross rails while lying on the plane supporting surfaces so that either the recess engages with the integrated protrusion or the protrusion engages with the integrated recess,
a retaining safety device is disposed between at least one profile-shaped cross rail and its corresponding holder, the retaining safety device being configured to counteract a move against the joining direction, and the at least two holders each comprise a flat supporting structure having a contact surface and a surface for adhesion parallel thereto, a material thickness of the flat supporting structure reducing from two opposing edges of the contact surface towards two opposing edges of the adhesion surface.

27. The mounting system as recited in claim 26, wherein the surface for adhesion has a rectangular format and the two opposing edges are disposed on narrow sides of the surface for adhesion.

28. The mounting system as recited in claim 27, wherein the PV Module has a rectangular format and long sides of the surface for adhesion are parallel to long sides of the PV Module.

* * * * *